(12) United States Patent
Nakajo

(10) Patent No.: US 7,436,744 B2
(45) Date of Patent: Oct. 14, 2008

(54) OPTICAL MEMORY DEVICE

(75) Inventor: Yukihisa Nakajo, Yokohama (JP)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 594 days.

(21) Appl. No.: 11/176,337

(22) Filed: Jul. 8, 2005

(65) Prior Publication Data

US 2006/0007819 A1 Jan. 12, 2006

(30) Foreign Application Priority Data

Jul. 9, 2004 (JP) ............................. 2004-203602

(51) Int. Cl.
*G11B 7/00* (2006.01)
(52) U.S. Cl. .................................. 369/47.53
(58) Field of Classification Search ................ 369/47.1, 369/47.5, 47.51, 47.53, 116
See application file for complete search history.

(56) References Cited

U.S. PATENT DOCUMENTS 7,352,659 B2 * 4/2008 Verschuren ............... 369/13.08

* cited by examiner

*Primary Examiner*—Nabil Z Hindi
(74) *Attorney, Agent, or Firm*—Volentine & Whitt, PLLC

(57) ABSTRACT

An optical memory device records and reproduces information by forming marks and lands in an optical information recording medium. The optical memory device includes: a first measuring part for measuring a length of each of the marks when information is recorded in the optical information recording medium using a reference write strategy and a write strategy in which widths of a specific mark and a powered pulse with respect to the reference write strategy are varied; a first measuring value memorizing part for memorizing a result of the first measuring part; a theory length memorizing part for memorizing theoretical lengths of the respective marks and lands; a first deviation value computing part for computing deviation value of each of the marks by changing the write strategy on the basis of the lengths of the marks memorized in the first measuring value memorizing part and the lengths of the mark memorized in the theory length memorizing part; a first contractile rate computing part for computing inherent contractile rates of all marks from the computed deviation value and an existing probability of each of the marks; a first write strategy setting part for setting an optimal write strategy by computing a correction value for the reference write strategy on the basis of the computed inherent contractile rates of and the existing probability of all the marks such that the deviation values of all the marks are within the predetermined range; a variation computing means for computing variations in lengths of the lands before and after each of the marks on the basis of the existing probability of each of the marks when the widths of the specific mark and powered pulse are varied.

6 Claims, 14 Drawing Sheets

|  | Ref(1) | +3, 4, 5T(2) |
|---|---|---|
| 3TM | 1.95 | 7.36 |
| 4TM | -3.54 | -1.74 |
| 5TM | 4.68 | 1.80 |
| 6TM | -0.16 | -6.18 |
| 7TM | -0.22 | -6.47 |
| 8TM | -0.45 | -6.53 |
| 9TM | -1.73 | -7.44 |
| 10TM | -2.16 | -8.82 |
| 11TM | -3.36 | -9.20 |
| 14TM | -6.05 | -12.09 |

(b)

| ((2)-(1))/2 |
|---|
| 2.70 |
| 0.90 |
| -1.44 |
| -3.01 |
| -3.13 |
| -3.04 |
| -2.85 |
| -3.33 |
| -2.92 |
| -3.02 |

Change of previous and next spaces when 3TM width is changed

Change of previous and next spaces when 4TM width is changed

Fig.14

When 3T mark is shifted backward 4T-14T marks are shortened
Existing probability
: R(4)+R(5)+ ·· +R(14)

3T mark does not change
Existing probability
: R(3)

Fig.15

|       | Calculated Value | Measured Value |
|-------|------------------|----------------|
| 3TM   | 25.3             | 26.0           |
| 4TM   | 28.2             | 29.8           |
| 5TM   | 30.7             | 30.4           |
| 5~14T | 20.5             | 20.8           |

(a)

(b)

OPTICAL MEMORY DEVICE

BACKGROUND OF THE INVENTION

1. Field of the Invention

The present invention relates to an optical memory device that can record information in an optical recording medium and reproduce recorded information from the optical recording medium. Examples of the optical recording medium include compact discs (CDs) and digital video discs (DVDs).

A claim of priority is made to Japanese patent application no. 2004-203602, filed Jul. 9, 2004, the contents of which are incorporated herein by reference.

2. Description of the Related Art

A variety of writable optical recording mediums are commercially available which allow users to record large amounts of information. Examples include write once read memory (WORM) type optical disks, such as CD-R discs, and rewritable type optical disks, such as CD-RW discs. More recently, high-capacity digital video discs (e.g., DVD-R, DVD-RW and DVD-RAM) have been introduced as the result of the use of shorter wavelength laser beams, decreased spot diameters, and thin substrates. Generally, data is recorded in the form of non-reflective marks along a spiral track of the optical discs. Herein, the term "mark" refers to the pit, spot or region along the track in which data of a given logic value (e.g., "1") is recorded along the track. For example, the marks may be formed as non-translucent dye regions in the case of CD-R discs, or as amorphous regions in the case of CD-RW discs. The spaces located between the marks along the spiral track are often referred to as "lands". The lands are typically formed as translucent dye regions in the case of CD-R discs, and as polycrystalline regions in the case of CD-RW discs.

In order to avoid extended gaps (which can cause tracking problems) where there are no marks in the data track of a compact disc, data is typically encoded using "Eight to Fourteen Modulation" (EFM). In EFM, 8-bit bytes are converted to 14 bits, with at least some of the 14 bits being logic "1" (marks). However, variations in physical characteristics among optical discs can result in improper recording of the EFM signal. That is, mark formation failures can occur for a variety of reasons, such as variations in the composition of the dye recording layer of the optical disk, and heat accumulation of the recording media coupled with an insufficient cooling rate. In other words, the writer parameters that might be best suited for one optical disc may not be ideal for another optical disc.

As such, in an effort to improve write accuracy, a reference write pattern is used to determine and set optimal or preferred write parameters of an optical disk to be recorded in advance of a recording operation. Herein, the set write parameters associated with an optical disc are referred to as a "write strategy" of the optical disc. It is known that this write strategy is closely related with a number of factors, including recording rate, dye material, phase-change material, dye film thickness, track configuration, and so on.

The write strategy generally defines or sets a number of variable write conditions of the optical disc. For example, the mark-to-land ratio may be varied, an additional pulse may be added to the front end of a write pulse, the rise or fall position of the pulse may be altered, a recording pulse may be converted to a multi-pulse format, and so on.

By varying the mark-to-land ratio, it becomes possible to provide a favorable shape for the front end and rear end of the mark, which is generated by irradiating a short pulse onto the optical disk at a high recording power, by shortening the length of the pit during a low speed recording.

Adding an additive pulse to the front end of a recording pulse enhances the shape of the front end, which is formed by additively applying a recording power to the front end of a pit that is difficult to deform by heat due to irradiation of a laser.

Changing the rise or fall position of a pulse by a combination of the mark and land can make uniform the length of the mark and land, which are formed by changing the position of the front end of the land according to the length of a rear land because the heat of any marks influences a next mark, the position of any land is changed or heat of the recording mark is transferred to a front according to the length of a front land, a rear position of a mark is changed or heat of a rear mark is transferred to a rear land to influence the rear land according to the length of the recording mark.

The method of converting a recording pulse into a multi-pulse is mainly used for a phase change disk, such as CD-RW, or DVD. When recording information in a phase change disk using a successive pulse, heat generated during the recording operation erases the front end of the recorded information. To solve the above erase problem, a multi-pulse having a cooling period between marks is used.

Since there exist in the market too many kinds of optical disks so that the manufacturers cannot grasp completely, it is impossible to prepare a proper write strategy in advance for all optical disks in the market.

Owing to the above problem, a method of recording information while varying a write strategy into two or more tracks in an optical disk area and selecting a write strategy of which reproduction jitter is minimized (e.g., Japanese Patent Publication No. 2000-30254), or a method of recording information using a specific record pattern and obtaining a combination of mark and land by which a jitter value or a deviation value is minimized (e.g., Japanese Patent Publication No. 2003-30837), is proposed.

However, in the method disclosed in Japanese Patent Publication No. 2000-30254, a finally selected write strategy is only the most favorable write strategy among the set write strategies and is not the optimal write strategy for an optical disk in use. In addition, the above method is problematic in that tracks are used as a record area for a test.

Also, since the method disclosed in Japanese Patent Publication No. 2003-30837 uses a specific write pattern, an influence of mark or land other than the case of changing a particular mark or land is not sufficiently considered. Accordingly, it is very difficult to set an optimal write strategy for an optical disk in use.

Further, according to the standard of DVD-R, variable combinations of mark and space include only three methods of 3T, 4T, and 5-14T. Meanwhile, since the variable range of each parameter is limited to a narrow range of −0.1T to +0.05T, a method, which approaches deviation to zero while the mark and space are put aside, has a limitation.

SUMMARY OF THE INVENTION

An embodiment of the present invention provides an optical memory device for recording and reproducing information by forming marks and lands in an optical information recording medium. The optical memory device includes: a first measuring part for measuring a length of each of the marks when information is recorded in the optical information recording medium using a reference write strategy and a write strategy in which widths of a specific mark and a powered pulse with respect to the reference write strategy are varied; a first measuring value memorizing part for memorizing a result of the first measuring part; a theory length memorizing part for memorizing theoretical lengths of the respective marks and lands; a first deviation value computing part for computing deviation value of each of the marks by changing the write strategy on the basis of the lengths of the marks memorized in the first measuring value memorizing part and the lengths of the mark memorized in the theory length memorizing part; a first contractile rate computing part for computing inherent contractile rates of all marks from the computed deviation value and an existing probability of each of the marks; a first write strategy setting part for setting an optimal write strategy by computing a correction value for the reference write strategy on the basis of the computed inherent contractile rates of and the existing probability of all the marks such that the deviation values of all the marks are within the predetermined range; a variation computing means for computing variations in lengths of the lands before and after each of the marks on the basis of the existing probability of each of the marks when the widths of the specific mark and powered pulse are varied; and a write strategy updating part for updating the write strategy by changing each of the marks such that the variations in the lengths of the lands before and after each of the marks are equal by adding the variation computed by the variation computing part to the write strategy set by the write strategy setting part.

Another embodiment of the present invention provides a method for recording optical information by forming marks and lands in an optical recording medium. The method includes: measuring a length of each of the marks when information is recorded in the optical information recording medium using a reference write strategy and a second write strategy in which widths of a specific mark and a powered pulse are changed with respect to the first write strategy; memorizing a measured result of the length of each of the marks; computing a deviation value of each of the marks by changing the write strategy on the basis of lengths of the marks memorized in advance and the lengths of the marks memorized in the memorizing step; computing inherent contractile rates of all marks from the computed deviation value and an existing probability of each of the marks; setting an optimal write strategy by computing a correction value for the reference write strategy on the basis of the computed inherent contractile rates of and the existing probability of all the marks such that the deviation values of all the marks are within the predetermined range; and updating the write strategy by adding the variations in the lengths of the lands before and after each of the marks when the widths of the specific mark and powered pulse computed on the basis of the existing probability of each mark are varied, to the write strategy set in the write strategy setting step and at the same time changing each of the marks such that the variations in the lengths of the lands before and after each of the marks are equal.

Another embodiment of the present invention provides a computer program for controlling an optical recording device to execute a method for recording optical information on a computer, where the method includes: measuring length of each of the marks when information is recorded in an optical information recording medium using a reference write strategy and a write strategy in which widths of a specific mark and a powered pulse are changed with respect to the reference write strategy; memorizing a measured result of the length of each of the marks; computing a deviation value of each of the marks by changing the write strategy on the basis of lengths of the marks memorized in advance and the lengths of the marks memorized in the memorizing step; computing inherent contractile rates of all marks from the computed deviation value and an existing probability of each of the marks; setting an optimal write strategy by computing a correction value for the reference write strategy on the basis of the computed inherent contractile rates of and the existing probability of all the marks such that the deviation values of all the marks are within the predetermined range; and updating the write strategy by adding the variations in the lengths of the lands before and after each of the marks when the widths of the specific mark and powered pulse computed on the basis of the existing probability of each mark are varied, to the write strategy set in the write strategy setting step and at the same time changing each of the marks such that the variations in the lengths of the lands before and after each of the marks are equal.

BRIEF DESCRIPTION OF THE DRAWINGS

The above an other aspects and features of the present invention will become readily understood from the detailed description that follows, with reference to the accompanying drawings, in which:

FIGS. 8A and 8B are tables showing examples of deviation values of respective marks according to an embodiment of the present invention;

FIG. 14 is a schematic view conceptually explaining an influence degree on spaces when a mark is changed according to an embodiment of the present invention;

FIG. 15 is a table showing computed values and measured values according to an embodiment of the present invention;

DETAILED DESCRIPTION OF THE PREFERRED EMBODIMENTS

The optical memory device and the write strategy setting method of the present invention will be described by way of preferred, but non-limiting, embodiments of the invention with reference to the accompanying drawings. As will be appreciated by those skilled in the art, the various "parts" shown in FIG. 1 may be physically implemented using a software controlled microprocessor, hard-wired logic circuits, or a combination thereof. Also, while the parts are functionally segregated in FIG. 1 for explanation purposes, they may be combined in any physical implementation.

Figure 1:
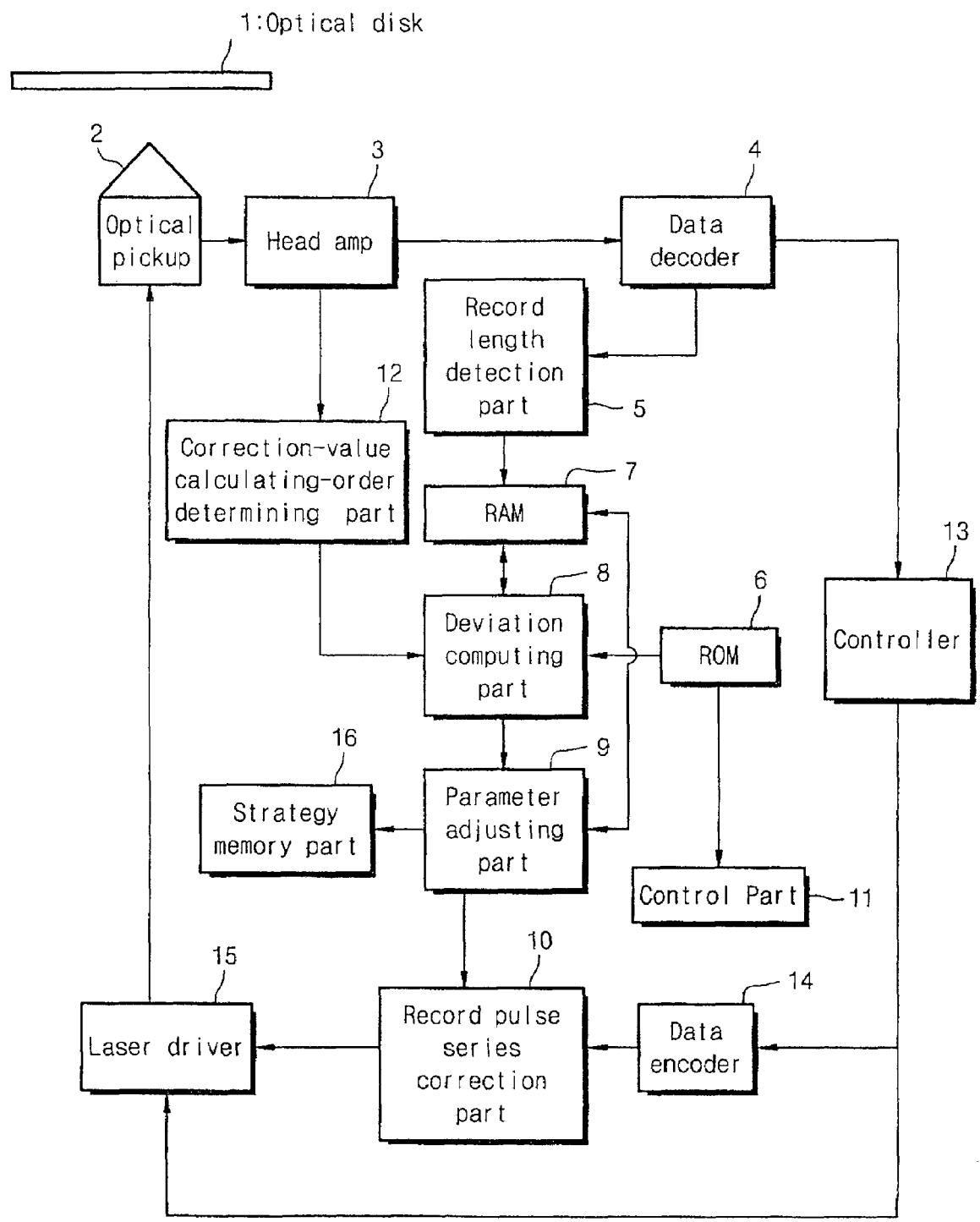
FIG. 1 is a block diagram of an optical memory device according to an embodiment of the present invention.

FIG. 1 is a functional block diagram of an optical memory device according to an embodiment of the present invention. Referring to FIG. 1, the optical memory device includes an optical information recording medium 1, an optical pickup 2, a head amplifier 3, a data decoder 4, a record length detection part 5, a read only memory (ROM) 6, a random access memory (RAM) 7, a deviation computing part 8, a parameter adjusting part 9, a record pulse series correction part 10, a control part 11, a correction-value computing-order determining part 12, a controller 13, a data encoder 14, and a laser driver 15.

In the example of this embodiment, the optical information recording medium 1 is an optical disc that is responsive to a semiconductor laser to record, reproduce and erase information. Examples include CD-Rs, CD-RWs, DVD Rs, DVD RWs, and DVD-RAMs.

The optical pickup 2 is used to record and reproduce information on the optical disc 1. Although not shown, the optical pickup 2 of this example includes a laser beam source such as a laser diode, a collimator lens, an objective lens driven by a focus actuator or a tracking actuator, optical elements such as a polarization beam splitter or a cylindrical lens, a four-division photodetector (PD) having four separate areas A, B, C and D that convert incident light into electrical signals, and a front monitor diode for monitoring a laser output during recording or reproducing operations.

The head amplifier 3 is coupled to the optical pickup 2 so as to generate an RF signal corresponding to the amount (intensity) of the light reflected from the respective areas of the four-division PD. The RF signal is output to the data decoder 4. In addition, the head amplifier 3 at the same time generates a focus error signal, i.e., a signal corresponding to a focus difference of the laser beams irradiated by the optical pickup 2, using astigmatism, and generates a tracking error signal, which corresponds to a signal detecting a direct deviation of the irradiation laser of the optical pickup 2. Also, in the present embodiment, the head amplifier 3 further has a function of measuring a jitter value of the generated RF signal and a function of detecting asymmetry from the RF signal.

The data decoder 4 generates an EFM signal from the RF signal generated by the head amp 3, converts the generated EFM signal into a signal of a desired format, and outputs the same to the controller 13.

The record length detection part 5 receives the EFM signal from the data decoder 4 and measures a pulse width of the EFM signal using a time measuring circuit (not shown).

ROM 6 is a non-rewritable storage unit and stores a control program for controlling all parts of the optical memory device. In addition, the ROM 6 stores a particular record pattern used in data recording, theoretical lengths of the mark and space, and the existing probability in the combination of the mark and space.

RAM 7 is a rewritable storage unit and temporarily stores a correction amount in each optical disc, a measurement result of the input record length from the record length detection part 5, a deviation value between the measurement value of the record length and the theoretical lengths of the mark and space, the inherent contractile rate of the mark and space, and the measured jitter value.

The deviation computing part 8 compares a deviation value between the measurement value of the record length stored in RAM 7 and the theoretical lengths of the mark and space with an already-calculated deviation value, to compute a difference value between the deviation values.

The parameter adjusting part 9 computes a correction value with respect to a reference write strategy on the basis of the inherent contractile rates of all the marks and spaces stored in RAM 7 and the existing probability stored in ROM 6 such that all the deviation values of the marks and spaces are within a predetermined range.

The record pulse series correction part 10 receives the correction value from the parameter adjusting part 9 and corrects the optical disc using the record pulse series on the basis of the received correction value so as to obtain an optimal record pulse series.

The control part 11 controls the overall operation of the optical memory device including information recording and reproducing according to the control program.

The correction—value computing—order determining part 12 determines a computing order of the inherent contractile rate of the mark and space corresponding to each setting parameter, on the basis of the deviation value before and after each edge when recording information using the reference write strategy and on the basis of the jitter value of the signal recorded by changing each setting parameter.

The controller 13 provides the data encoder 14 with a record signal and also reads the record signal from the data decoder 4.

The data encoder 14 converts the record signal provided from the controller 13 into EPM signal or the like and outputs the same to the record pulse series correction part 10.

The laser driver 15 generates a pulse signal for driving the laser diode according to the input record pulse and provides a semiconductor laser (not shown) of the optical pickup 2 with the same.

Next, a procedure for setting an optimal write strategy for a particular optical disc will be described with reference to FIGS. 2 through 19. In this embodiment, there is provided a method for setting an optimal write strategy on an optical disc, such as a DVD-R, which has a few combination of the mark and space capable of changing parameters and also has a few variation of the parameters. A detailed method will be described below.

The marks and lands on a CD do not directly correspond to 1's and 0's of the stored data. Rather, the start and end of a mark (i.e. the mark edges) each correspond to 1's, and all other areas, both within the marks and on the lands, correspond to 0's. CD standards require that there are at least two and at most ten 0's between every 1. As suggested previously, this is achieved using EFM by converting every 8-bit byte into a 14-bit value. The shortest possible mark (or land) thus represents 3 EFM bits (100), and the longest 11 EFM bits (10000000000). If a single bit requires time T to pass under the read head, then marks of these lengths can be referred to as 3T marks and 11T marks.

Figure 2:
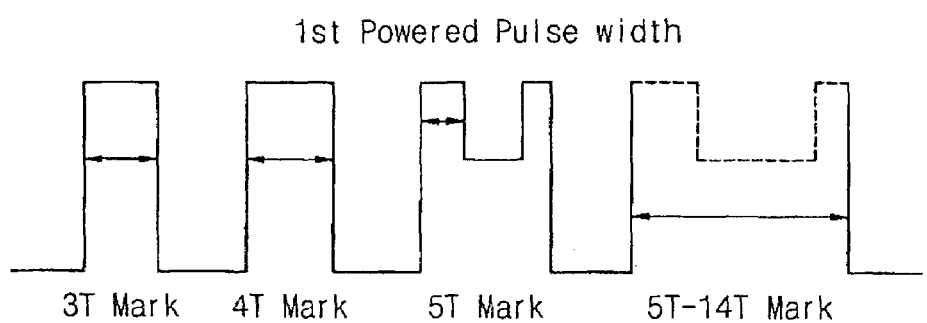
FIG. 2 is a waveform for use in explaining a concept according to an embodiment of the present invention.
Figure 3:
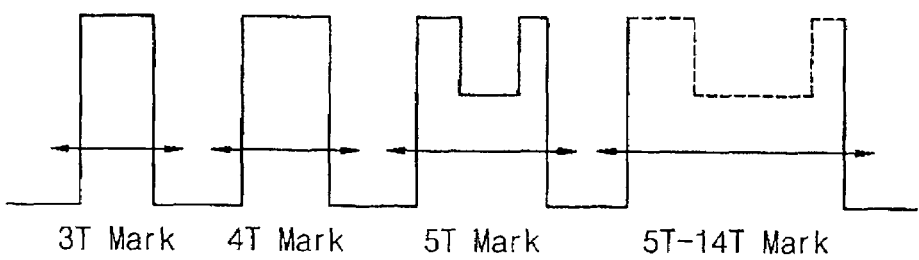
FIG. 3 is a waveform for use in explaining a concept according to an embodiment of the present invention.

FIGS. 2 and 3 are waveforms for explaining concepts associated with embodiments of the present invention. In the exemplary embodiments of the present invention, each mark width is adjusted on the basis of the deviation and the existing probability of each mark. The deviation is calculated from the length of the mark and the theoretical length of the mark recorded in the reference write strategy and the write strategy (refer to FIG. 2) where the pulse widths of 3T, 4T and (5T-14T) marks and powered pulse are changed with respect to the reference write strategy. Meanwhile, the length of space before and after each mark which is influenced by the adjustment of the mark width is corrected, and the mark is adjusted such that the lengths of the space before and after the mark are equal to each other (refer to FIG. 3).

Figure 4:
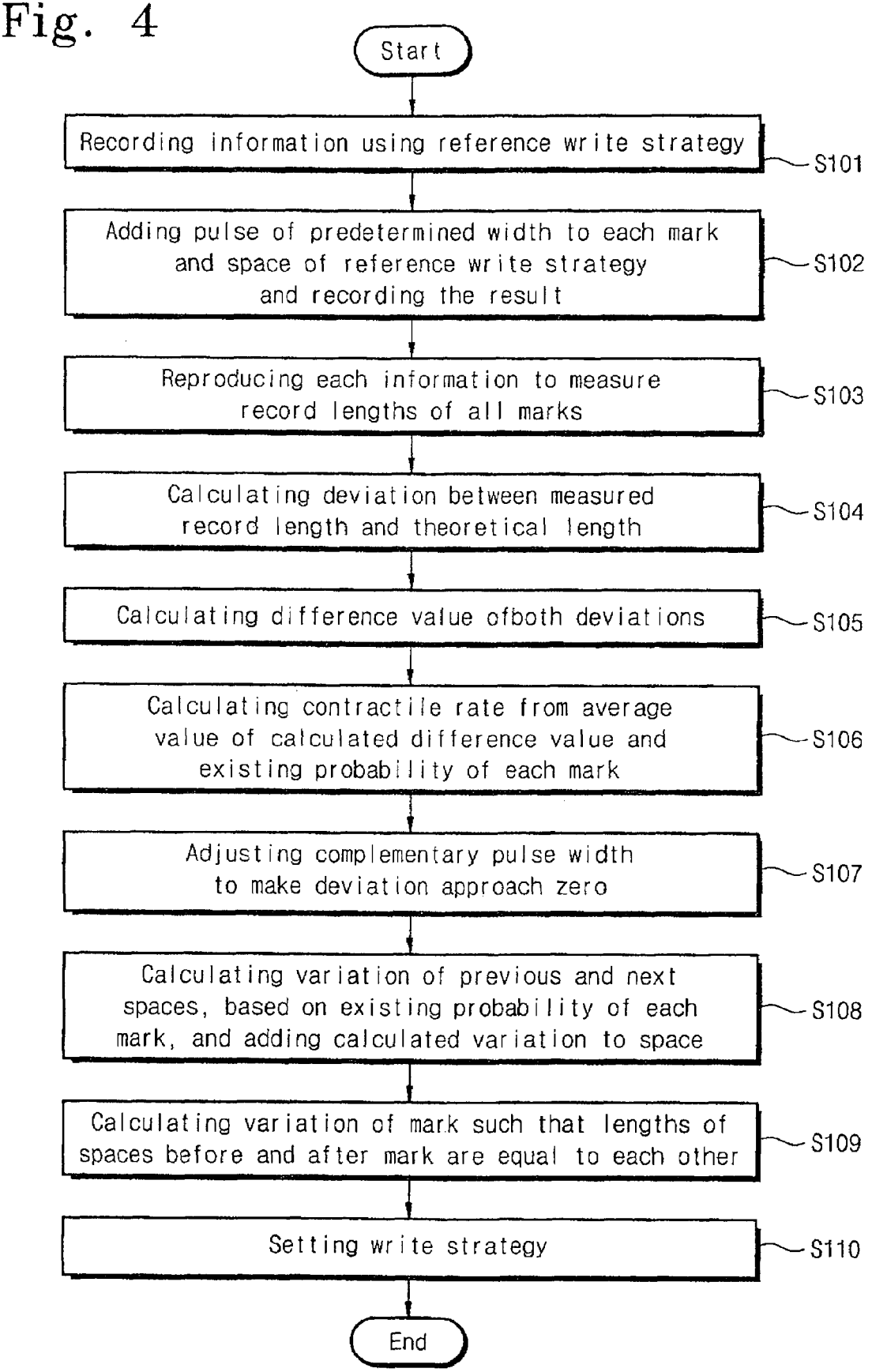
FIG. 4 is a flow chart for explaining the setup of a suitable write strategy by varying the width of a mark according to an embodiment of the present invention.

This procedure will be described below in detail with reference to FIG. 4.

First, the reference write strategy is output from the controller 13 to the laser driver 15 and information is recorded on a predetermined area of the optical disc using the reference write strategy (S101). Then, information is recorded using a write strategy where a pulse of a predetermined pulse width is added to each mark (3T, 4T, 5T-14T mark in FIG. 2) and a powered pulse (a powered pulse of 5T in FIG. 2) (S102). When the recording of the information is finished, each recording information is reproduced. The record length detection part 5 measures a length of each mark on the basis of the signal from the data decoder 4, and stores the measurement result in the RAM 7 (S103).

Thereafter, the deviation computing part 8 computes the deviation on the basis of the theoretical length of each mark stored in the ROM 6 and the measured value stored in the RAM 7 (S104). The computed deviation is output to the parameter adjusting part 9. The parameter adjusting part 9 calculates a difference value between two deviations of each input mark (S105) and calculates the inherent contractile rate of each mark from the average value of the calculated difference value and the existing probability of each mark (S106).

A method for calculating the inherent contractible rate of each mark will be described below with reference to FIG. 8.

In FIG. 8(*a*), Ref(1) represents a deviation with respect to theoretical lengths from the 3T mark to the 11T and 14T marks when the information is recorded using the reference write strategy. +3, 4 and 5T(2) represent a deviation with respect to theoretical lengths form the 3T to the 11T and 14T marks when the information is recorded using the write strategy where the minimum resolving power is doubled in the widths of the 3T and 4T marks and the powered pulse width of the 5T mark with respect to the reference write strategy. Also, FIG. 8(*b*) illustrates an average value of difference values Δ of the deviations in FIG. 8(*a*). In the example of FIG. 8, the average value (AVE(6T-14T)) of the difference values of the deviation from 6T to 14T is −3.04.

Assuming that the inherent contractile rates of the widths of the 3T and 4T marks and the powered pulse width of the 5T mark are respectively Δ3T, Δ4T, and Δ5T and their existing probabilities are respectively R(3), R(4) and R(5), and the average value of the deviation of each mark is d3T, d4T and d5T, a following equation 1 is satisfied with respect to the 3T to 5T marks.

3TM:

$$d3T = \Delta 3T - \Delta 4T \times R(4)/(1-R(4)) - \Delta 5T \times R(5)/(1-R(5))$$

4TM:

$$d4T = \Delta 4T - \Delta 3T \times R(3)/(1-R(3)) - \Delta 5T \times R(5)/(1-R(5))$$

5TM:

$$d5T = \Delta 5T \times \Delta 3T \times R(3)/(1-R(3)) - \Delta 5T \times R(4)/(1-R(4))$$ Equation 1

As can be seen from the equation 1, in the average values d3T, d4T and d5T of the deviation of each mark, the influence from the other mark is added to the inherent contractile rate of each mark. In the equation 1, R(3), R(4) and R(5) are the existing values, and d3T and d4T and d5T are the measured values, and thus Δ3T, Δ4T and Δ5T can be obtained by solving the third-order simultaneous equation.

In the example of FIG. 8, operation for changing the mark width is performed with respect to 3T to 5T marks, but not to 6T to 14T. The average values (AVE(6T-14T)) of the difference values of the deviations of 6T to 14T are the deviations generated from the changing of the 3T to 5T marks. That is, using Δ3T, Δ4T, Δ5T, R(3), R(4) and R(5), AVE(6T-14T) can be expressed as a following equation 2.

$$AVG(6T-14T) = -\Delta 3T \times R(3)/(1-R(3)) - \\ \Delta 4T \times R(4)/(1-R(4)) - \\ \Delta 5T \times R(5)/(1-R(5))$$ Equation 2

Substituting the equation 2 into the equation 1, the result becomes a following equation 3. From the equation 3, the inherent contractile rates Δ3T, Δ4T and Δ5T of the 3T and 4T mark widths and the powered pulse width of the 5T mark can be obtained as a following equation 4. Accordingly, if measuring d3T, d4T and d5T from R(3), R(4) and R(5), the inherent contractile rates Δ3T, Δ4T and Δ5T can be obtained.

3TM:

$$d3T = \Delta 3T \times 1/(1-R(3)) + AVG(6T-14T)$$

4TM:

$$d4T = \Delta 4T \times 1/(1-R(4)) + AVG(6T-14T)$$

5TM:

$$d5T = \Delta 5T \times 1/(1-R(5)) + AVG(6T-14T)$$ Equation 3

$$\Delta 3T = (d3T - AVG(6T-14T)) \times (1-R(3))$$

$$\Delta 4T = (d4T - AVG(6T-14T)) \times (1-R(4))$$

$$\Delta 5T = (d5T - AVG(6T-14T)) \times (1-5(R))$$ Equation 4

If the calculation of the inherent contractile rate of each mark is finished, a width of a supplementary pulse is adjusted such that the deviation approaches zero, on the basis of the inherent contractile rate of each mark (S107). A detailed description about this process will be described below with reference to FIGS. 5 to 7.

Figure 5:
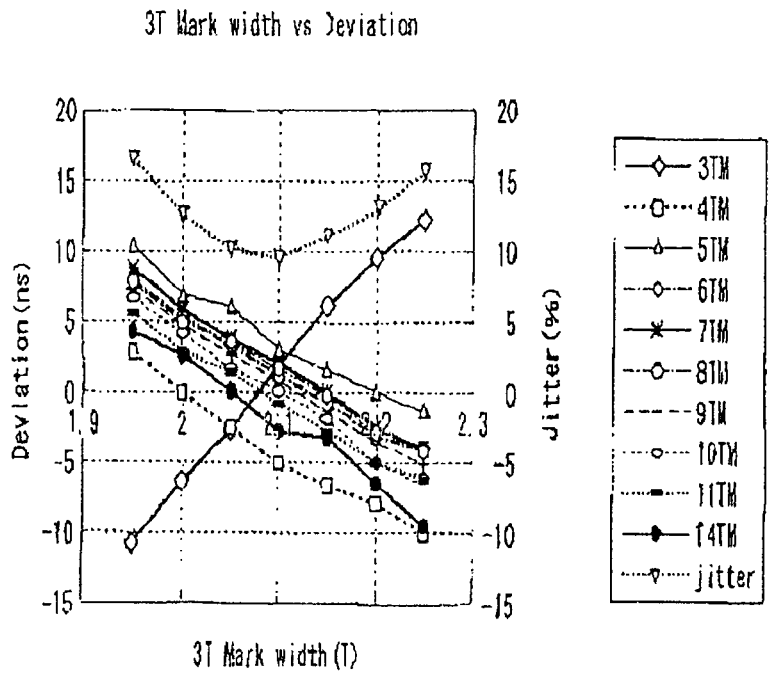
FIG. 5 is a graph showing an influence degree on widths of marks other than a 3T mark when the width of the 3T mark is varied according to an embodiment of the present invention.
Figure 6:
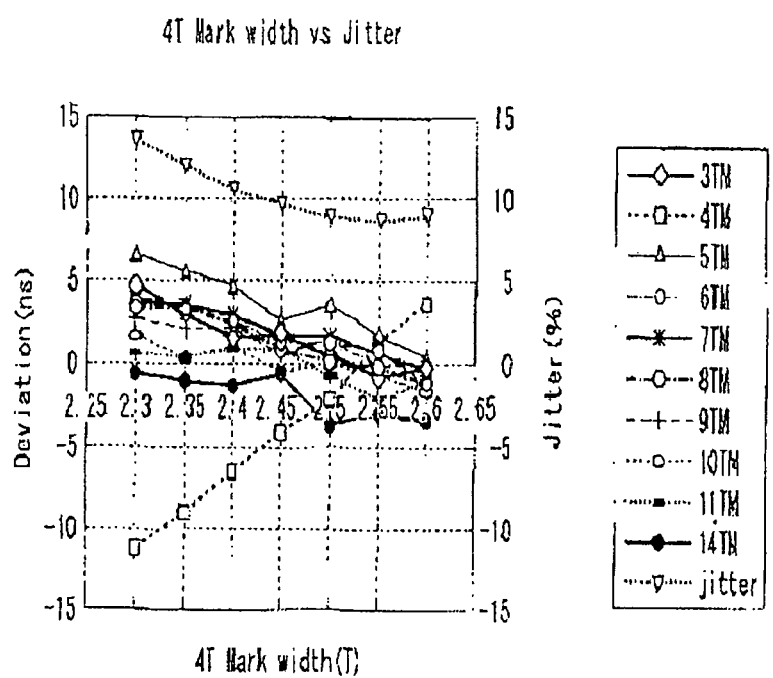
FIG. 6 is a graph showing an influence degree on widths of marks other than a 4T mark when the width of the 4T mark is varied according to an embodiment of the present invention.

FIG. 5 is a graph illustrating variations of other marks and jitter when a 3T mark width is changed. FIG. 6 is a graph illustrating variations of other marks and jitter when a 4T mark width is changed. As can be seen from FIG. 5, when the width of the 3T mark is changed by a predetermined amount, the deviation of other marks is changed in a straight line from + deviation to − deviation as the mark width is increasing.

In addition, it can be seen that the when an absolute value of the deviation of each mark is minimal, the best jitter value is given. This tendency is equal to the case of FIG. 6 where the 4T mark is changed. That is, based on the above fact, a suitable write strategy is set by minimizing the absolute value of the deviation of each mark.

Figure 7:
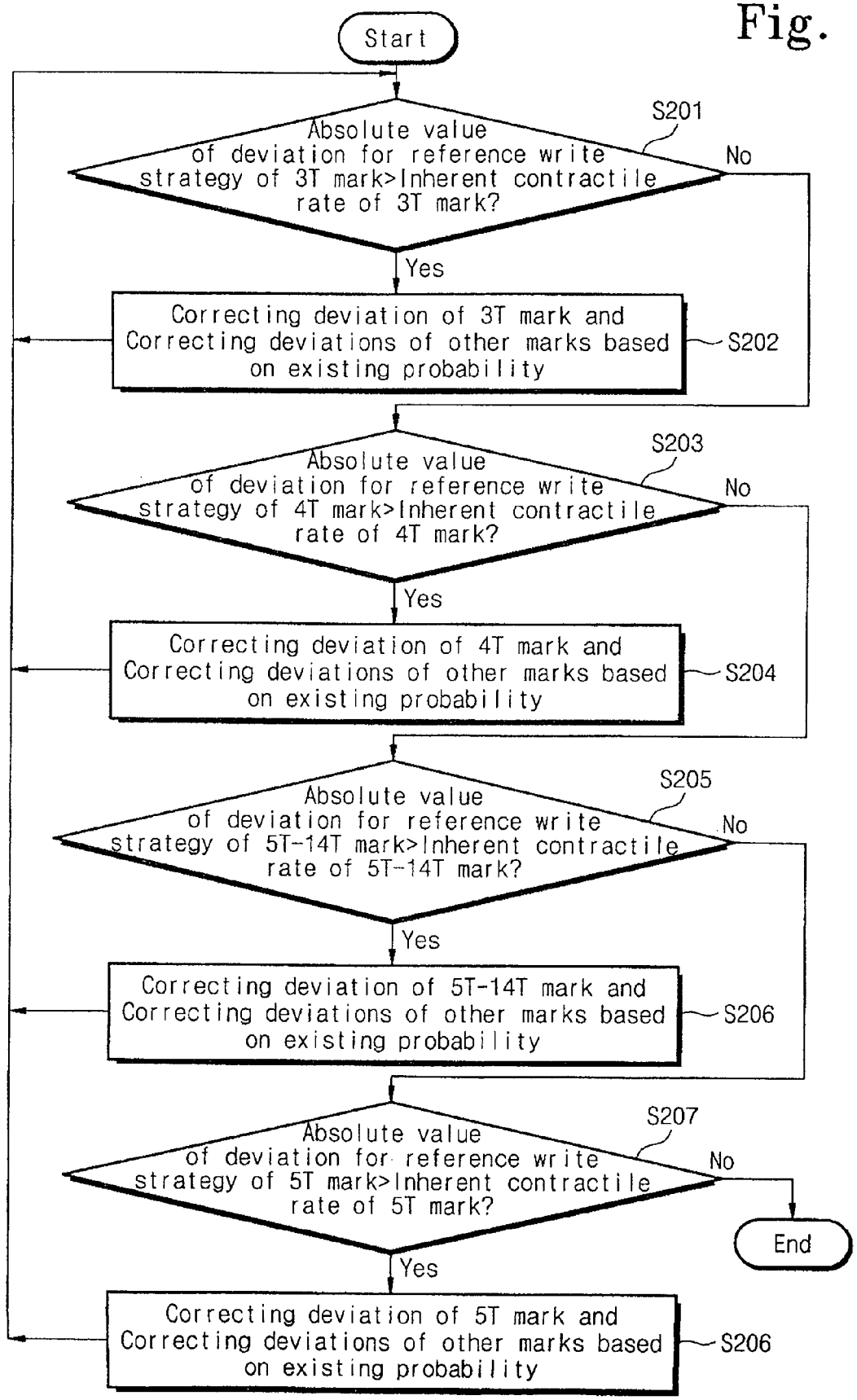
FIG. 7 is a flow chart for explaining the minimization of a deviation of each mark according to an embodiment of the present invention.

In more detail, as shown in FIG. 7, the parameter adjusting part 9 reads the absolute value of the deviation for the reference write strategy of the 3T mark and the inherent contractile rate of the 3T mark stored in the RAM 7, and determines whether the absolute value of the deviation is larger than the inherent contractile rate of the 3T mark (S201). If larger, the deviation of the 3T mark is corrected and deviation of the other marks is corrected based on the existing probability of each mark (S202). Then, the process returns to the step S201 and it is determined whether the absolute value of the deviation for the reference write strategy of the 3T mark is larger than the inherent contractile rate of the 3T mark.

Meanwhile, if the absolute value of the deviation is smaller than the inherent contractile rate of the 3T mark, the parameter adjusting part 9 reads the absolute value of the deviation for the reference write strategy of the 4T mark and the inherent contractile rate of the 4T mark stored in the RAM 7, and determines whether the absolute value of the deviation is larger than the inherent contractile rate of the 4T mark (S203). If larger, the deviation of the 4T mark is corrected and deviation of the other marks is corrected based on the existing probability of each mark (S204). Then, the process returns to the step S201 and it is determined whether the absolute value of the deviation for the reference write strategy of the 3T mark is larger than the inherent contractile rate of the 3T mark. These processes are performed on the 5T-14T mark and the 5T mark. If the absolute value of the deviation for the reference write strategy of the 5T mark is smaller than the inherent contractile rate of the 5T mark, the process is ended and the corrected pulse width is stored in the RAM 7 by a series of processes.

By the processes of the steps to S107, the deviation with respect to the marks can be minimized. However, the influence on the spaces before and after the mark still remains. This influence on the spaces will be described below with reference to FIGS. 9 and 10.

Figure 9:
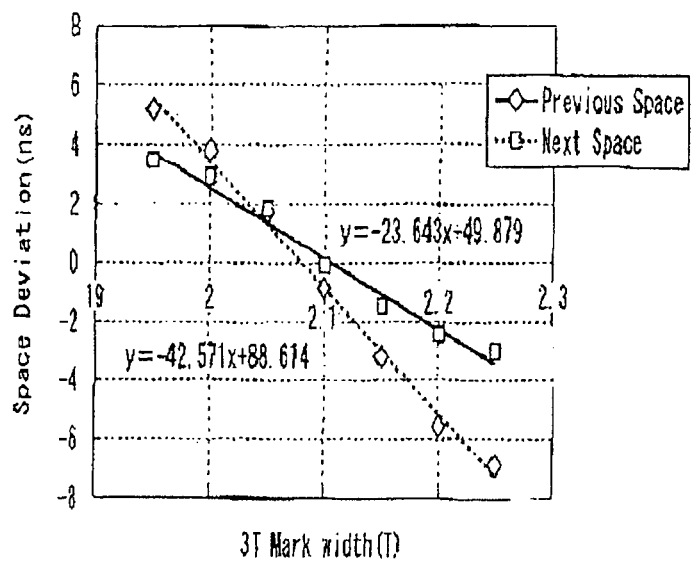
FIG. 9 is a graph showing an influence degree on spaces before and after a 3T mark when the width of the 3T mark is varied according to an embodiment of the present invention.
Figure 10:
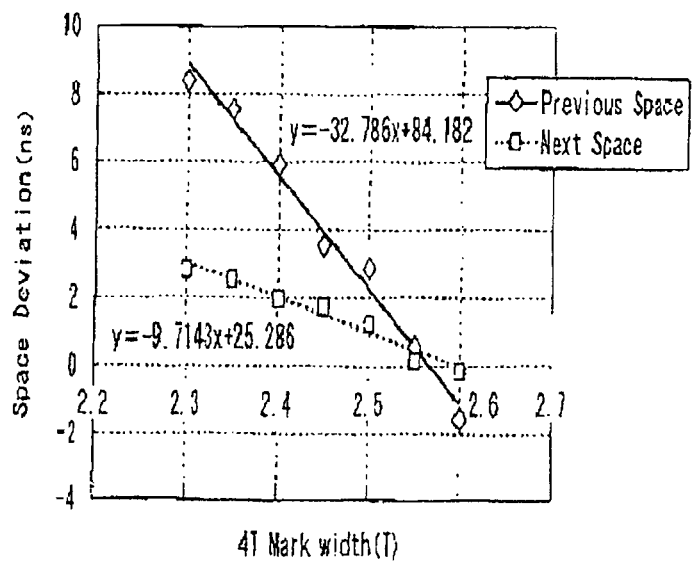
FIG. 10 is a graph showing an influence degree on spaces before and after a 4T mark when the width of the 4T mark is varied according to an embodiment of the present invention.
Figure 11:
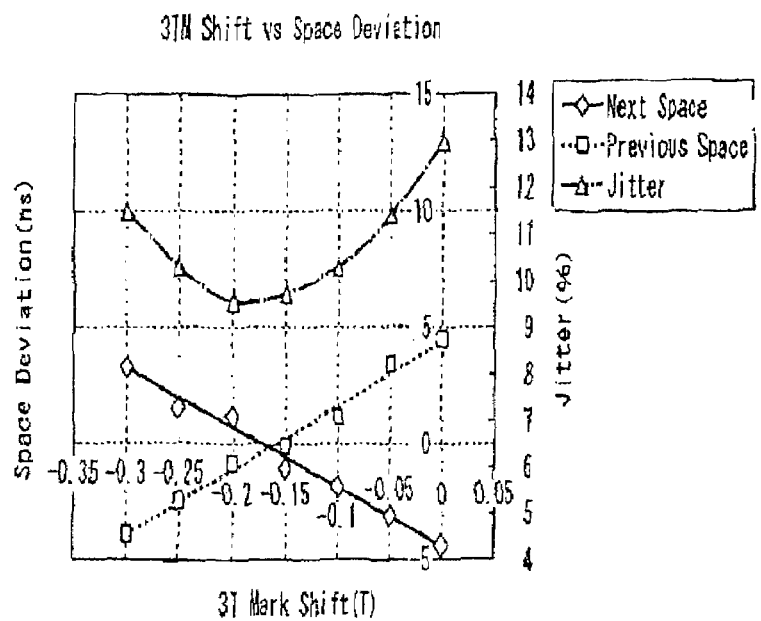
FIG. 11 is a graph showing an influence degree on spaces before and after a 3T mark when the 3T mark is changed according to an embodiment of the present invention.

FIG. 9 is a graph illustrating a deviation change of the spaces before and after the mark when the 3T mark width is changed, and FIG. 10 is a graph illustrating a deviation change of the spaces before and after the mark when the width of the 4T mark is changed. Referring to FIG. 9, when the width of the 3T mark is changed by a predetermined amount, though the change rate is different between before the 3T mark and after the 3T mark, both the width of the space before the 3T mark and the width of the space after the 3T mark are changed in a straight line. In FIG. 9, assuming that Y axis is the deviation of the space and X axis is the 3T mark width, the space width after the 3T mark is changed on a straight line of y=−23.643x+49.879, and the space width before the 3T mark is changed on a straight line of y=−42.571x+88.614. As shown in FIG. 10, this tendency equally appears when the 4T mark is changed. In FIG. 10, assuming that Y axis is the deviation of the space and X axis is the 4T mark width, the space width before the 4T mark is changed on a straight line of y=−32.786x+84.182, and the space width after the 4T mark is changed on a straight line of y=−9.7143x+25.286.

In addition, as shown in FIGS. 9 and 10, the influence on the spaces before and after the mark when the 3T mark width is changed is different from the influence when the 4T mark is changed. As described above, the influence on the spaces before and after the mark when a specific mark width is changed is different. Further, the tendency of the influence on the spaces before and after the mark when the specific mark width is changed is dependent on the resolving power of the optical memory device.

In other words, when the specific mark width is changed, the degree of the influence on the spaces before and after the mark is examined as shown in FIGS. 9 and 10 and is then stored. In this manner, when the specific mark width is changed, the influence on the spaces before and after the mark can be calculated.

In this embodiment, this relationship is previously stored, and the supplementary pulse width is determined just like the case where the deviation approaches zero in the step S107. Then, by the addition of the supplementary pulse, the influence on the spaces before and after the mark is calculated and is added to the space (S108).

Then, each mark is changed such that the deviations of the spaces before and after the mark become equal to each other (S109). As is apparently shown in FIG. 13, the best jitter value is provided when the deviations of the spaces before and after the mark are equal to each other.

Figure 13:
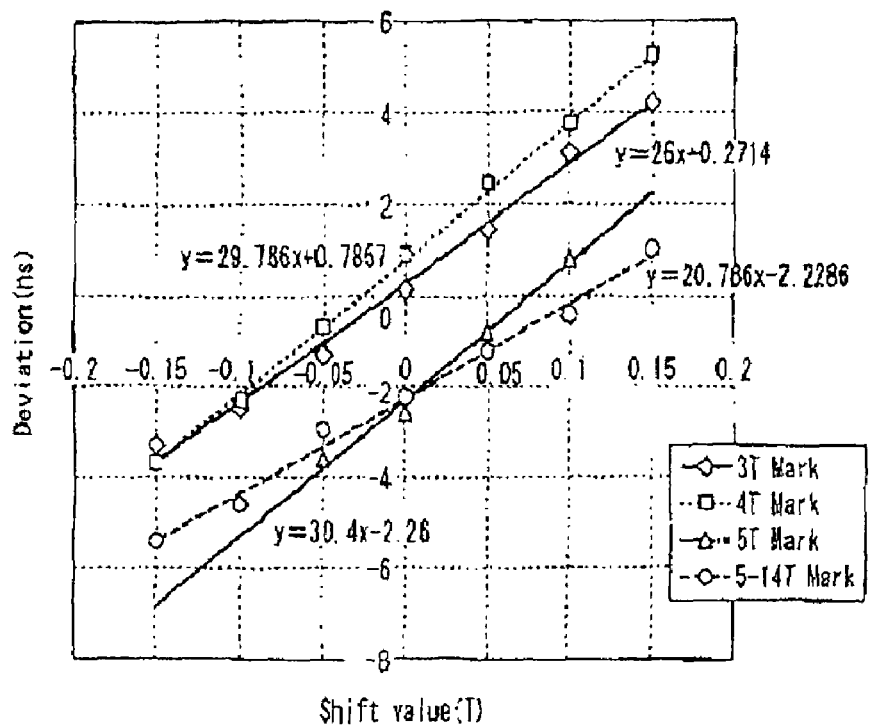
FIG. 13 is a graph showing an influence degree on a space after a selected mark when the selected mark is varied according to an embodiment of the present invention.

In practice, however, the degrees of the influence on the spaces before and after other marks are different according to the changed specific mark. In FIG. 13, the degree of the influence on the spaces before and after the mark is expressed as the average value of the deviations when the 3T mark, the 4T mark, the 5T mark, and 5-14T marks are changed. Referring to FIG. 13, in all cases, the deviation change exhibits a straight line with respect to the mark width change, but slopes of the straight line are different according to which mark is changed.

Figure 12:
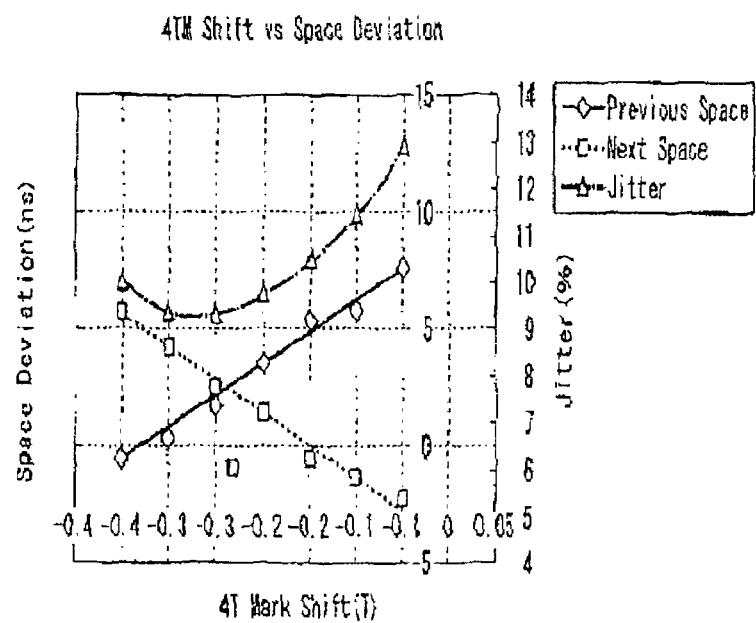
FIG. 12 is a graph showing an influence degree on spaces before and after a 4T mark when the 4T mark is changed according to an embodiment of the present invention.

As shown in a following equation 5, an influence coefficient $K(n)$ on the spaces existing before and after the mark is dependent on an existing probability $R(n)$ of a width D of 1T and an existing probability $R(n)$ of each mark in the optical memory device. That is, as shown in FIG. 12, when the 3T mark is shifted backward, there is no change with respect to the space inserted into the 3T marks. However, regarding the space inserted into the nT marks that are different from the 3T mark, the length of the inserted space is shortened according to the existing probability of the nT marks. Accordingly, based on the relationship of the equation 5, the influence coefficient $K(n)$ on the spaces before and after the mark is calculated, and the degree of the influence is added thereto. Then, the deviation of each mark is calculated such that the deviations for the lengths of the spaces before and after the mark are equal to one another (S109). Based on the calculated deviation, a suitable write strategy is set (S110).

$$K(n)=D\times(1-R(n)) \qquad \text{Equation 5}$$

Figure 16:
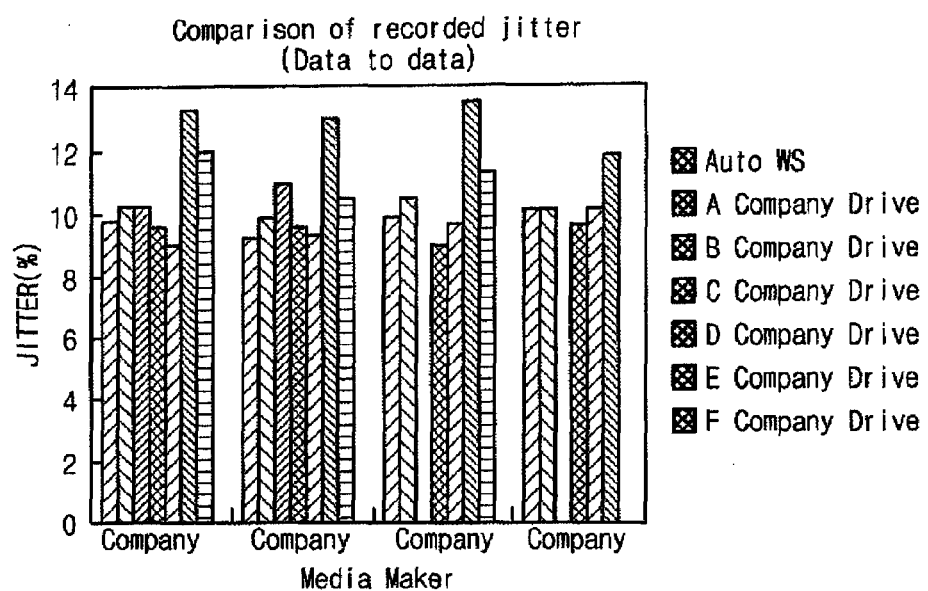
FIG. 16 is a graph explaining an effect of the present invention.

FIG. 15 is a table illustrating the relationship between the influence coefficient and the measured value for the spaces before and after the mark, which is obtained when the existing probabilities of the periods 3T, 4T, 5T, 5T-14T are respectively 31.5%, 23.8%, 17.1% and 44.7% and the width of 1T is 37 ns. It can be seen from FIG. 15 that the calculated value and the measured value are very close to each other. FIG. 16 is a graph illustrating the jitter values, based on the media, in the case where the information is recorded using the write strategy (corresponding to Auto WS) set based on the flow chart of FIG. 4, and the case where the information on the commercially available products is recorded. As can be seen from FIG. 6, the recording quality of the information recorded using the write strategy of this embodiment has a good result with respect to any media.

As shown in FIG. 16, the write strategy more suitable than the prior art can be set. A more suitable write strategy can be set by following processes. These processes will be described in detail with reference to FIGS. 17 to 19.

Figure 17:
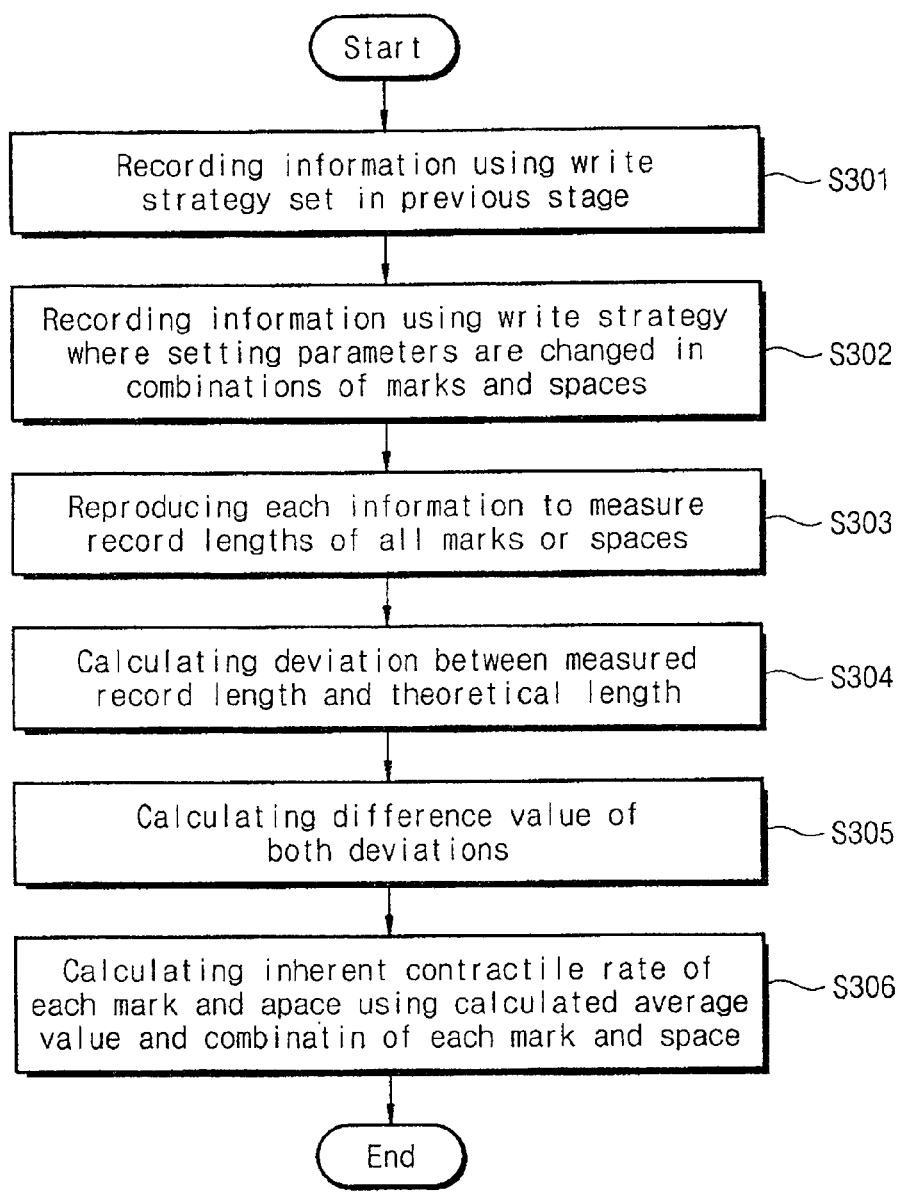
FIG. 17 is a flow chart showing a flow of obtaining inherent contractile rate according to an embodiment of the present invention.
Figure 18:
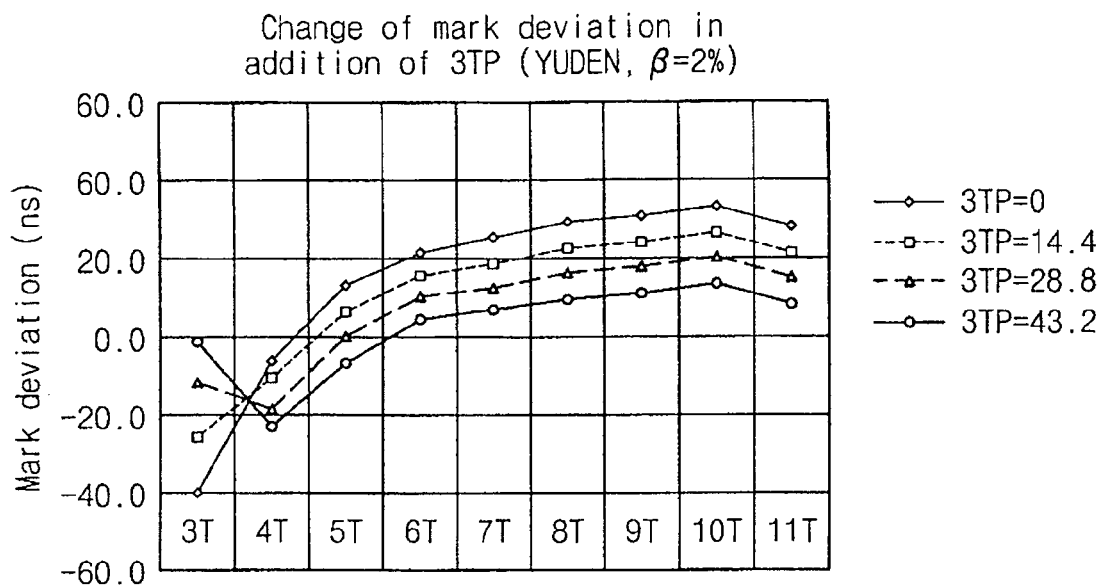
FIGS. 18A and 18B are graphs showing an influence degree of macro in changing the length of 3T mark or 6T mark.
Figure 18:
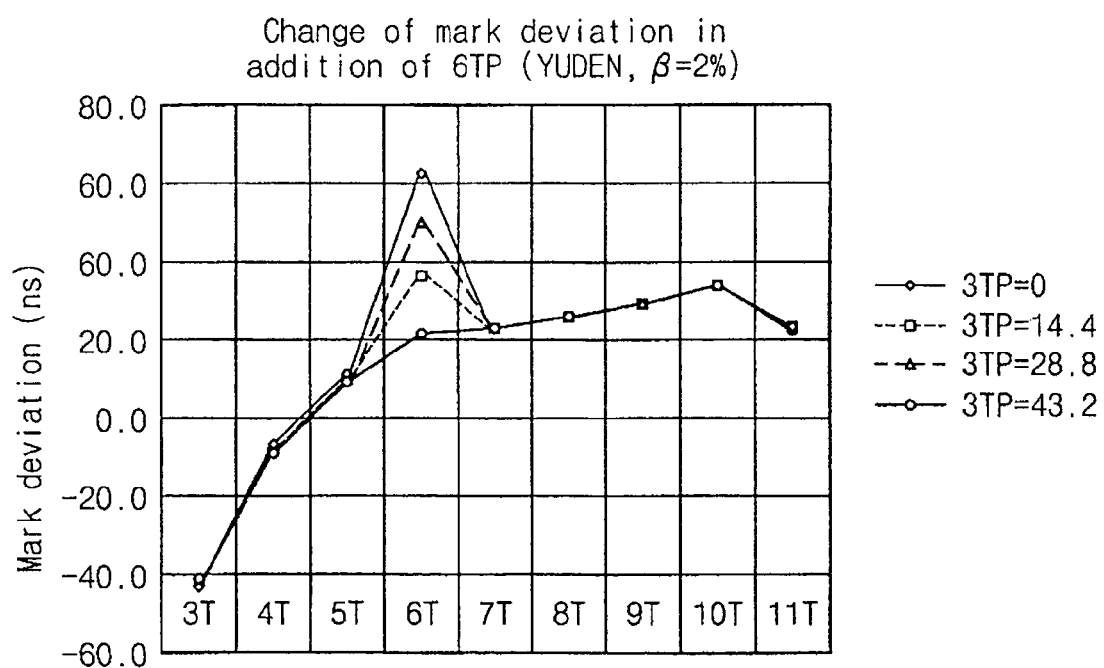
Figure 19:
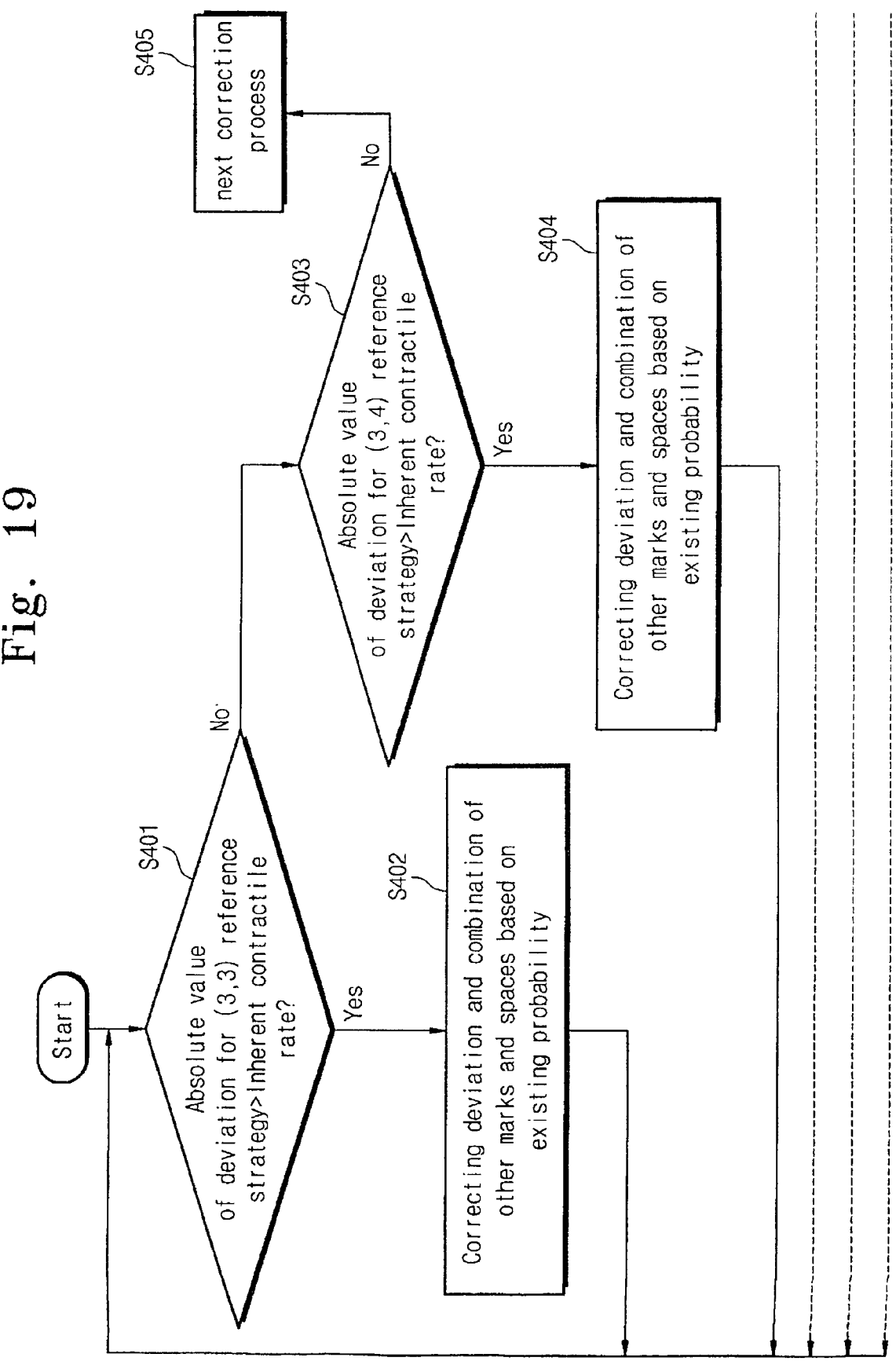
FIG. 19 is a flow chart for explaining a sequence of selecting an optimal adjustment parameter.

Referring to FIGS. 17 to 19, the degrees of the influence when lengths of other spaces or marks are changed are calculated using the existing probabilities by the combination of each mark and the space, and the inherent contractile rate of each mark and space is calculated using the calculated degrees of the influence.

The mark and space of the EFM signal is constructed such that a total sum of the mark lengths is equal to a total sum of the space lengths. For example, when the length of a certain space is lengthened, a distribution balance of the mark and the space is broken. In order to correct this problem, the lengths of the spaces including the changed specific space are shortened as a whole. In a real reproducing waveform (RF signal), this phenomenon appears as the state where a slice level is changed.

For example, in the case of the CD, the change of the mark length of 4T to 11T, except the case where the 3T mask is extended by $\Delta T(3T)$ among the EFM signals appears like in FIG. 18. In FIG. 8(a), Y axis represents the deviation of the theoretical length and X axis represents the marks 3T to 11T. Each line represents the change of each deviation when the pulse addition of 14.4 ns, 28.8 ns and 43.2 are performed when the pulse addition of the 3T mark is zero.

If the existing probability of the 3T mark in the EFM signal is 33%, a relationship of the variation in the marks 4T to 11T satisfies a following equation 6.

$$\Delta T(3T) \times 0.33 = \Delta T(4-11T) \times (1-0.33)$$

$$\Delta T(4-11T) = 0.33 / (1-0.33) x \Delta 3T \quad \text{Equation 6}$$

The variation of the marks 4T to 11T is half the variation of the 3T mark. It is supported by the measured result shown in FIG. 18(a). As shown in FIG. 18(b), when the 6T mark having a low existing probability is changed, the degree of the influence on other marks or spaces is very low.

Accordingly, the use of the existing probabilities by combination of each mark and space makes, it possible to check the degree of the influence on other marks or spaces when the length of the specific mark or space is changed. Based on this viewpoint, the method for calculating the inherent contractile rate of each mark and space will be described in detail with reference to FIGS. 17 and 18.

The control part 11 sets the write strategy, which is set in a previous step and stored in the RAM 7, in the record pulse series correction part 10 and then performs the record operation (S301). Then, regarding this write strategy, the 3T to 5T marks before the 3T to 5T spaces having the high degree of influence on other marks and spaces and high existing probability are recorded using the write strategy that is extended as much as the multiple of integers of the minimum resolving power that can set the write strategy (S302). Considering the post-processing, the contractile rate is good in the minimum resolving power. However, if the minimum resolving power is extremely small, the multiple of the integers of the minimum resolving power is preferable so as to minimize the influence from error. Because LSI setting the write strategy is operated on the basis of a given clock, it is impossible to alter successively in analog the write strategy. Accordingly, discrete alteration is performed under the condition that the minimum change is one clock. Herein, minimum change is called minimum resolution.

If the respective record operations are finished, the corresponding record signals are reproduced and the record length detection part 5 measures the record length in combination of all marks and spaces and stores the measurement results in the RAM 7 for each write strategy (S303).

The deviation computing part 8 calculates a deviation between the record length recorded using the strategy set in the previous stage and stored in the RAM 7 and the theoretical length in combination of all marks and spaces stored in the ROM 6, and also calculates a deviation between the record length recorded when a predetermined mark and space is recorded using the write strategy extended by the multiple of the integers of the minimum resolving power and the theoretical length in combination of all marks and spaces stored in the ROM 6 (S304). In addition, the deviation computing part 8 calculates a deviation of both cases (S305).

In order to calculate the inherent contractile rate of each mark and space from the calculated deviation, the existing probability obtained from the combination of each mark and space is used (S306). In the step S306, after calculating the inherent contractile rate with respect to the combination of each mark and space, a correction value making the deviation approach zero is calculated as shown in FIG. 19.

According to the inventive method for calculating the correction value, using the inherent contractile rate corresponding to the contraction of the minimum resolving power, the strategy when the information is recorded using the write strategy set in the previous stage is suppressed below the minimum resolving power. In this manner, the optimum write strategy is set.

The input of the correction value for each mark and space is processed in order of high existing probabilities. That is, if the combination of the mark and space having the high existing probability is corrected, its influence is greatly affected on combinations of other marks and spaces. In this manner, each correction value can be treated for a short time.

In more detail, as shown in FIG. 19, with respect to the combination of the 3T mark and the 3T space having the highest existing probability, it is determined whether the absolute value of the deviation with respect to the strategy set in the previous stage is larger than the inherent contractile rate (S401). When the absolute value of the deviation for the reference strategy is larger than the inherent contractile rate, the deviation is corrected and at the same time the deviations for the combinations of other marks and spaces are corrected based on the existing probabilities (S402).

Meanwhile, if the absolute value of the deviation for the reference strategy is smaller than the inherent contractile rate, the combination of the 3T mark and 4T space having a second highest existing probability is corrected (S403). This combination of the 3T mark and 4T space is corrected in the same manner as above (S403, S404). This process is also performed on the combination of the 14T mark and the 14T space.

According to this embodiment, the combination of the variable mark and space is limited. Even when the variable range of the parameters is narrow, the optimum parameters can be set on the optical memory device for a short time.

The present invention provides a small number of the combinations of the marks and spaces, which can be adjusted as written in the DVD-R specification. In addition, even when the variable range of each parameter is narrow, the optimum write strategy can be set.

Further, by adding the calculated mark width to the influence on the spaces before and after the specific mark, the variation of the mark is calculated such that the lengths of the marks before and after the specific mark are made equal to each other. Thus, it is possible to reduce the calculation burden of the optical memory device and the loads on the memory.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An optical memory device for recording and reproducing information by forming marks and lands in an optical information recording medium, the optical memory device comprising:

first measuring part for measuring a length of each of the marks when information is recorded in the optical information recording medium using a reference write strategy and a write strategy in which widths of a specific mark and a powered pulse with respect to the reference write strategy are changed;

first measuring value memorizing part for memorizing a result of the first measuring part;

theory length memorizing part for memorizing theoretical lengths of the respective marks and lands;

first deviation value computing part for computing a deviation value of each of the marks by changing the write strategy on the basis of the lengths of the marks memorized in the first measuring value memorizing part and the lengths of the marka memorized in the theory length memorizing part;

first contractile rate computing part for computing inherent contractile rates of all marks from the computed deviation value and an existing probability of each of the marks;

first write strategy setting parts for setting an optimal write strategy by computing a correction value for the reference write strategy on the basis of the computed inherent contractile rates of and the existing probability of all the marks such that the deviation values of all the marks are within the predetermined range;

variation computing part for computing variations in lengths of the lands before and after each of the marks on the basis of the existing probability of each of the marks when the widths of the specific mark and powered pulse are changed; and write strategy updating part for updating the write strategy by changing each of the marks such that the variations in the lengths of the lands before and after each of the marks are equal by adding the variation computed by the variation computing part to the write strategy set by the write strategy setting part.

2. The optical memory device of claim 1, further comprising:

second measuring part for measuring a length of each of the marks or lands when information is recorded using the updated write strategy and a write strategy in which a predetermined mark or a land is changed with respect to the updated write strategy;

second measuring value memorizing part for memorizing a result of the second measuring part;

second deviation value computing part for computing a deviation value in the length of each of the marks or lands by changing the write strategy on the basis of the lengths of the marks or lands memorized in the second measuring value memorizing part and the lengths of the marks or lands memorized in the theory length memorizing part;

second contractile rate computing part for computing inherent contractile rates of all the marks or lands from the computed deviation value and an existing probability of length of each of the marks or lands; and second write strategy setting part for setting an optimal write strategy by computing a correction value for the updated write strategy on the basis of the computed inherent contractile rates of and the existing probability of all the marks and lands such that the deviation values of all the marks are within the predetermined range.

3. A method for recording optical information by forming marks and lands in an optical information recording medium, comprising:

measuring a length of each of the marks when information is recorded in the optical information recording medium using a reference write strategy and a write strategy in which widths of a specific mark and a powered pulse with respect to the reference write strategy are changed;

memorizing a measured result of the length of each of the marks;

computing a deviation value of each of the marks by changing the write strategy on the basis of lengths of the marks memorized in advance and the lengths of the marks memorized in the memorizing step;

computing inherent contractile rates of all marks from the computed deviation value and an existing probability of each of the marks;

setting an optimal write strategy by computing a correction value for the reference write strategy on the basis of the computed inherent contractile rates of and the existing probability of all the marks such that the deviation values of all the marks are within the predetermined range; and updating the write strategy by adding the variations in the lengths of the lands before and after each of the marks when the widths of the specific mark and powered pulse computed on the basis of the existing probability of each mark are changed, to the write strategy set in the write strategy setting step and at the same time changing each of the marks such that the variations in the lengths of the lands before and after each of the marks are equal.

4. The method of claim 3, further comprising:

measuring a length of each of the marks or lands when information is recorded using the updated write strategy and a write strategy in which a predetermined mark or a land is changed with respect to the updated write strategy;

memorizing a result obtained in the measuring step;

computing a deviation value in the length of each of the marks or lands by changing the write strategy on the basis of the lengths of the marks or lands memorized in the memorizing step and the lengths of the marks or lands memorized in advance;

computing inherent contractile rates of all the marks or lands from the computed deviation value and an existing probability of length of each of the marks or lands; and setting an optimal write strategy by computing a correction value for the updated write strategy on the basis of the computed inherent contractile rates of and the existing probability of all the marks and lands such that the deviation values of all the marks are within the predetermined range.

5. A computer program which controls an optical recording device to execute a method for recording optical information by forming marks and lands in an optical information recording medium, the method comprising:

measuring a length of each of the marks when information is recorded in the optical information recording medium using a reference write strategy and a write strategy in which widths of a specific mark and a powered pulse with respect to the reference write strategy are changed;

memorizing a measured result of the length of each of the marks;

computing a deviation value of each of the marks by changing the write strategy on the basis of lengths of the marks memorized in advance and the lengths of the marks memorized in the memorizing step;

computing inherent contractile rates of all marks from the computed deviation value and an existing probability of each of the marks;

setting an optimal write strategy by computing a correction value for the reference write strategy on the basis of the computed inherent contractile rates of and the existing probability of all the marks such that the deviation values of all the marks are within the predetermined range; and updating the write strategy by adding the variations in the lengths of the lands before and after each of the marks when the widths of the specific mark and powered pulse computed on the basis of the existing probability of each mark are changed, to the write strategy set in the write strategy setting step and at the same time changing each of the marks such that the variations in the lengths of the lands before and after each of the marks are equal.

6. The program of claim 5, wherein the method further comprises:

measuring a length of each of the marks or lands when information is recorded using the updated write strategy and a write strategy in which a predetermined mark or a land is changed with respect to the updated write strategy;

memorizing a result obtained in the measuring step;

computing a deviation value in the length of each of the marks or lands by changing the write strategy on the basis of the lengths of the marks or lands memorized in the memorizing step and the lengths of the marks or lands memorized in advance;

computing inherent contractile rates of all the marks or lands from the computed deviation value and an existing probability of length of each of the marks or lands; and setting an optimal write strategy by computing a correction value for the updated write strategy on the basis of the computed inherent contractile rates of and the existing probability of all the marks and lands such that the deviation values of all the marks are within the predetermined range.

* * * * *